United States Patent [19]

Griveau et al.

[11] Patent Number: 4,968,204
[45] Date of Patent: Nov. 6, 1990

[54] PUSHER FOR MAGAZINE OF IRRADIATED FUEL ELEMENTS

[75] Inventors: Richard Griveau, Versailles; Daniel Kerlau, Chatenay Malabry; Daniel Tucoulat, Cormeilles en Parisis; Jean Colas, Bagnols sur Ceze; Robert Pellier, Saint-Paul le Jeune, all of France

[73] Assignee: Compagnie Generale des Matieres Nucleaires, France

[21] Appl. No.: 316,499

[22] Filed: Feb. 27, 1989

[30] Foreign Application Priority Data

Feb. 29, 1988 [FR] France ............................. 88 02498

[51] Int. Cl.⁵ .............................................. B26D 7/00
[52] U.S. Cl. .......................................... 414/15; 83/930
[58] Field of Search ..................... 414/14, 15, 16, 17, 414/18; 83/930, 276, 409.2; 376/268, 269, 272; 100/95

[56] References Cited

U.S. PATENT DOCUMENTS

| | | | |
|---|---|---|---|
| 3,722,338 | 3/1973 | Cherel | 83/930 X |
| 3,763,770 | 10/1973 | Ehrman et al. | 100/39 |
| 3,807,018 | 4/1974 | Ehrman et al. | 29/200 D |
| 4,091,699 | 5/1978 | Chaze et al. | 83/56 |
| 4,245,532 | 1/1981 | Astill et al. | 83/930 X |
| 4,528,879 | 7/1985 | Eisenacher | 83/930 X |
| 4,566,361 | 1/1986 | Dubost et al. | 83/454 |

Primary Examiner—David A. Bucci
Assistant Examiner—James T. Eller, Jr.
Attorney, Agent, or Firm—Louis Weinstein

[57] ABSTRACT

This invention relates to a pusher placed in a magazine for irradiated fuel elements which allows displacement thereof for the cutting operations. The pusher according to the invention allows the displacement of elements of small section in a magazine of large section. At the end of a cutting operation, the pusher applies its blank against the auxiliary holding clamp forming a continuous surface and the element is pushed by a blade, the body of the pusher being immobilized.

10 Claims, 4 Drawing Sheets

4,968,204

PUSHER FOR MAGAZINE OF IRRADIATED FUEL ELEMENTS

FIELD OF THE INVENTION

The invention relates to a device for displacing an irradiated fuel in a magazine, called a pusher.

BACKGROUND OF THE INVENTION

In installations for reprocessing irradiated fuels, the fuel elements issuing from the reactors are stored in a pond, cut in shears and the pieces obtained are dissolved.

A fuel element comprises two so-called end-pieces made of metal which imprison the ends of the pencils, the latter contain the fuel but are bereft thereof over a small length at their ends.

The length and section of the element may vary; it depends on the type of reactor from which the element issues. In PWR's, the elements have sections of the order of 270 mm$^2$; in BWR's, of the order of 120 mm$^2$. The BWR elements are slightly shorter than the PWR elements.

The element having left the storage pond is placed in a magazine adaptable to the shearing device. The magazine generally has a rectangular or square section (adapted to the shape of the element); it is formed by non-mobile metal walls. Forward or rearward displacement of the element in the magazine is obtained by means of a pusher combined with a so-called drive element. The pusher acts on a so-called head endpiece of the element.

This pusher makes it possible to advance the element towards the blade of the shears, and, if it is provided with grab means, to cause it to move backwards. The drive device gives the force of thrust (or of reverse travel) applied to the pusher; this may, for example, be a jack, a pusher chain, or the like.

The dimensions of the magazine have consequences on the arrangement and dimensions of the holding down clamps (holding pads) in particular which are placed at the free end of the magazine and which compress the element to be sheared. Consequently, when it is desired to pass from one type of element to another, the clamps and other relevant pieces of the shears must first be replaced. This operation is effected by remote control (the prevailing radio-activity prohibiting access to human beings) and by means of a lifting bridge handling a beam on which the pieces to be changed are fixed.

When passing from elements of large dimensions (PWR) to elements of smaller dimensions (BWR), it might be envisaged to conserve the same magazine in order to avoid the operations described hereinabove.

However, in that case, the cuts at the end of the elements raise problems. This state of the art is illustrated in FIGS. 1 and 2 of the accompanying drawings.

FIGS. 1 and 2 show the end of cut on a BWR element in a magazine for PWR elements, not provided with the device according to the invention. (FIGS. 3 to 8 show the device according to the invention).

According to FIG. 1 (view in elevation), the fuel element 1 of small dimensions (BWR) with its endpiece 2 and its pencils 3 is disposed in a magazine 4 whose dimensions correspond to those of the elements of larger dimensions. The pusher 5 formed by metal walls has substantially the section and depth of an endpiece of PWR element. It may thus imprison the endpiece of the PWR element, but it does not maintain the endpiece of the smaller BWR element.

In FIGS. 1 and 2, inserts are placed in the pusher so as to maintain the head endpiece 2 fixed and to ensure a controlled thrust under the action of a pusher chain 10.

In order to be cut, the element is placed horizontally; it abuts on the lower part 6 of the magazine (FIG. 1 in elevation) and on wall 7 of the magazine corresponding to the counter-blade (FIG. 2 in plan view). This wall 7 is the one located opposite the action of the holding clamps 8 and 9 (holding pads).

For cutting, the principal clamp 9 compresses the pencils so as to render them contiguous, the auxiliary clamp 8 by its action maintains their curvature regular.

When cutting comes to an end, the auxiliary clamp 8 must be withdrawn so as to allow cut of the pencils near the endpiece; by way of indication, about 500 mm of pencil remain.

Reverse movement of this clamp 8 leaves between the pusher 5 and said clamp a recess in which the pencils still in place which have been subjected to actions of deformation during cut of the element, are blocked and break. This phenomenon is illustrated in FIG. 2.

Moreover, as shown in FIG. 1, vertical expansion of the pencils being free (the section of the magazine is larger than that of the element and the clamps compress pencils in the horizontal direction), breakage of the pencils at the level of endpiece 2 is promoted.

During the opening of the clamp 9 necessary for the advance of the element, the free pencils 11 may tip over and obturate the spout supplying the dissolver (not shown).

SUMMARY OF THE INVENTION

In order to avoid these drawbacks, the present invention proposes a pusher acting on the endpiece of a fuel element in order to displace it in a horizontal magazine towards a cutting device which comprises an auxiliary holding clamp, a principal holding clamp and a cutting blade cooperating with a counter-blade, said pusher comprising a body of which the largest transverse section is substantially equal to that of the magazine, and a means for driving said body, characterized in that it comprises, in said body:

a cavity of transverse section substantially equal to that of the endpiece, open on the lower wall of the magazine, on its lateral wall corresponding to the counter-blade and on the front face of the body, a recess open over the whole height of the body, on the lateral wall of the magazine corresponding to the holding clamps and on the front face of the body, in which the auxiliary holding clamp may be housed, a blank thus being defined in the body of the pusher between the recess and the cavity, so that, when the force of thrust exerted on the element by the auxiliary clamp is eliminated, said blank cooperates with the thrust surface of said auxiliary clamp in order to maintain the element laterally, a mobile blade disposed in the bottom of said cavity, in contact with the endpiece and, actuated by a drive means, capable of displacing the element when the front face of the blank arrives at the level of the principal clamp; the locking means which connects said blade and the driving means to the body of the pusher then being unlocked.

BRIEF DESCRIPTION OF THE DRAWINGS

The invention will be more readily understood on reading the following description with reference to the accompanying drawings, in which:

FIGS. 4 to 8 (side elevation views) also show section views of the device and embodiment thereof of the device shown in FIG. 3A looking in the direction of arrows 3a—3a.

DESCRIPTION OF THE PREFERRED EMBODIMENT

Figure 1:
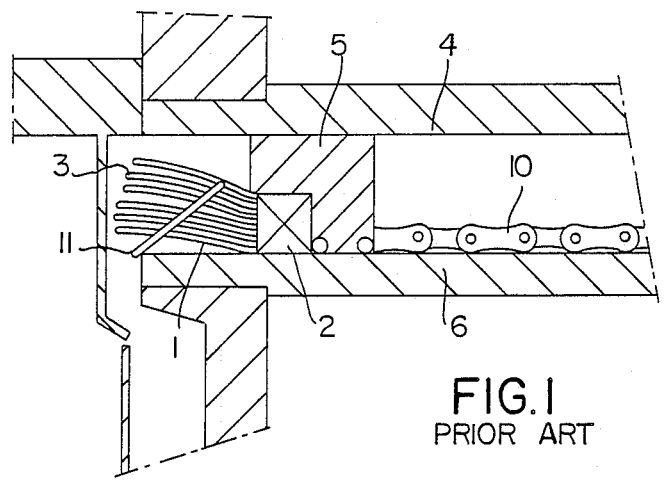
FIGS. 1 and 2 are respectively, elevation and plan views of a prior art pusher assembly as set forth hereinabove.
Figure 2:
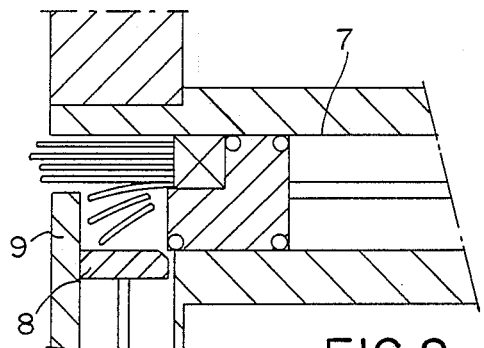
Figure 3:
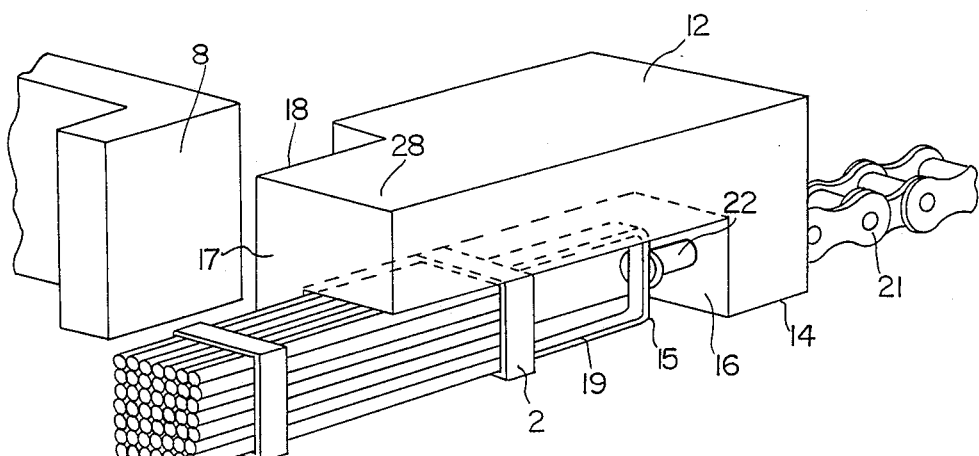
FIG. 3 shows a simplified view in perspective of the device according to the invention, except for the locking device and the magazine.
Figure 3A:
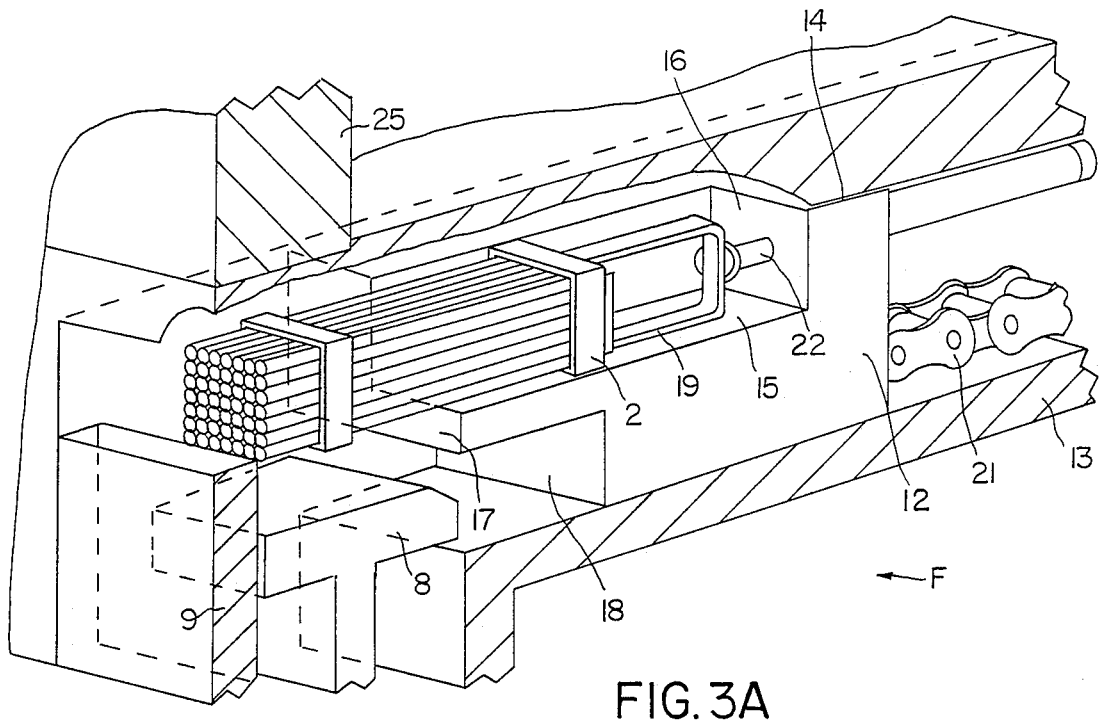
FIG. 3A shows a detailed perspective view of the device of the present invention showing all of the elements thereof in their proper orientation when in normal use.

According to FIG. 3, the body of the pusher 12 is constituted by a parallelepipedic metal piece whose section is slightly smaller than that of the magazine (shown in FIG. 4)—just sufficient to ensure its sliding movement.

Two recesses are made in this piece.

One, open on a large edge 14 of the piece, lengthwise (dimension parallel to the longitudinal axis) but not over the whole length, constitutes cavity 15. This recess presents a section substantially equal to that of the endpiece 2 so that the element to be cut may slide therealong.

Said cavity has a bottom 16 and is open on the front face 17 of the metal piece (whose section is substantially equal to that of the magazine at this stage of machining). The other recess 18 is made on the edge perpendicular and opposite to edge 14 and adjacent the front surface 17, the recess is cut out over the whole height of the piece (viz. all the edge, the auxiliary clamp having a height virtually equal to that of the magazine) and over a length (dimension along the longitudinal axis) at least equal to the length of the auxiliary clamp 8. In this recess 18 is housed the clamp 8 at the end of the cutting operation.

A blank 28 is thus defined in the body 12 of the pusher, which presents a front face 17, a face in contact with the lower wall of the magazine and its lateral faces being those of the recesses.

At the bottom 16 of the cavity 15, a mobile blade 19 is disposed which may be provided with grab means. Its drive system 20 is constituted, according to FIG. 3, by a pushing chain 21 extended by a telescopic piston 22; this system may also be a jack, a screw/nut system or the like.

According to the embodiment shown, the drive system 20 of the blade is also that of the pusher. This advantageous arrangement is not necessary; another means for driving the pusher may be provided in addition. For example, each of the means for driving the pusher and the blade may be a jack.

Figure 4:
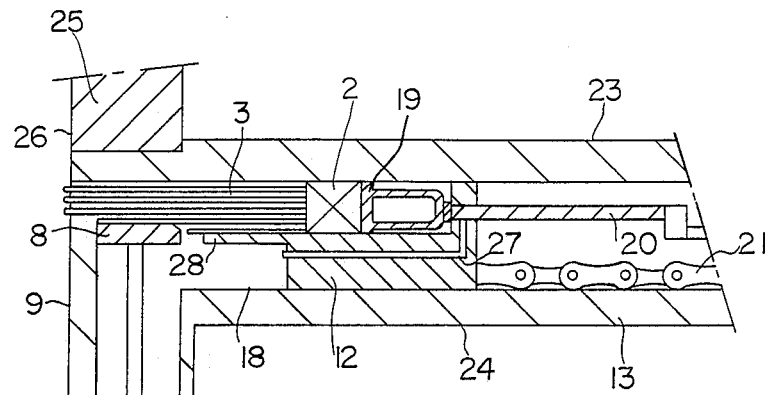

A locking means 27 (of which an embodiment is shown in FIG. 4) connects the drive means 20 with the blade 19 to the body of the pusher 12. The locking means may be mounted between the drive means 20 and the body of the pusher (FIGS. 4 to 8) or between the blade and the body of the pusher (not shown).

When the locking means is in place, the whole pusher is displaced. When it is released, the drive means 20 alone acts on the blade 19 to displace the element, the body of the pusher remaining in place.

The device is employed as described from FIGS. 4 to 8.

The magazine 13, of which the lateral walls 23 and 24 are seen in plan view, is, when it is in place for the cutting operations, in abutment on the frame 25 of the shears. This frame bears the counter-blade against which the principal holding clamp 9 compresses the pencils 3, the face 26 of the counter-blade cooperates with the cutting blade placed in the immediate proximity of the clamp 9. The auxiliary clamp 8 is placed in the immediate proximity of the opening of the magazine.

The pusher 12 is disposed in the magazine so that the recess 18 is opposite the lateral wall 24 of the magazine corresponding to the clamps. In this way, the cavity 15 has an opening on the lower wall of the magazine and on its lateral wall 23 corresponding to the counter-blade.

Cutting is effected as follows:

Element 1 being in the magazine disposed horizontally for cutting and the endpiece 2 being in contact with the blade 19, the element is advanced by the desired length of cut ("cutting step") by the single drive means 20 which acts on the whole of the pusher, the locking means being in place between the body of the pusher and the drive means.

Between each advance of the element, the clamps 8 and 9 are slightly loosened and then retightened for cutting.

Figure 5:
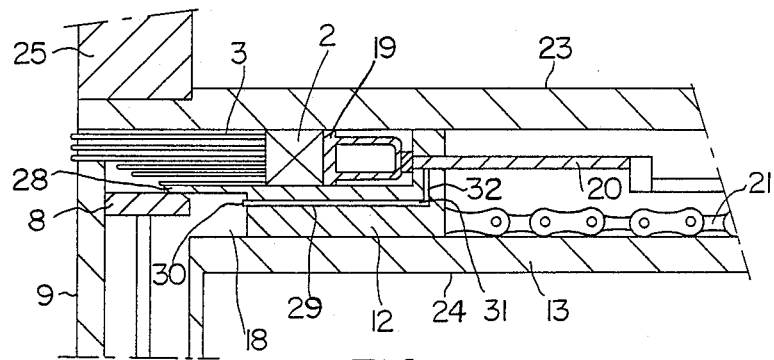

When the end 17 of the cavity 15 arrives near clamp 8 (so-called precut phase), an automatic control (based on measurement of distance or/and the presence of a mark, etc.), triggers off the reverse movement of the auxiliary clamp 8 by a value just sufficient to allow passage of the blank 28 of the pusher and thus to ensure a virtually continuous plane for holding the element during the reverse movement of the principal clamp 9 during the advance by a cutting step (FIG. 5).

Everything then occurs virtually as if cutting were carried out in a BWR magazine (adapted for the element of smaller section). The element remains maintained towards the clamps during the pre-cut phase and during the end of cutting.

The blank 28 should have a small width, so that the hollow which exists between said blank and the clamp (FIG. 5) is reduced. It suffices to make the recess 18 over a larger width.

As the front face 17 of the pusher comes virtually into contact with the principal clamp 9 (FIG. 6), it replaces the surface of clamp 8, thus ensuring a continuous plane surface.

Figure 6:
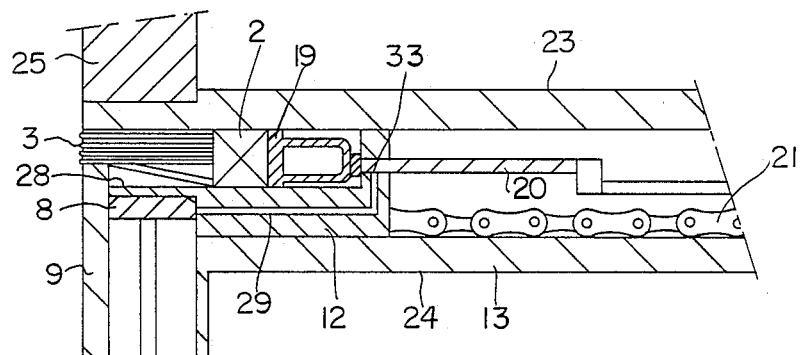
Figure 7:
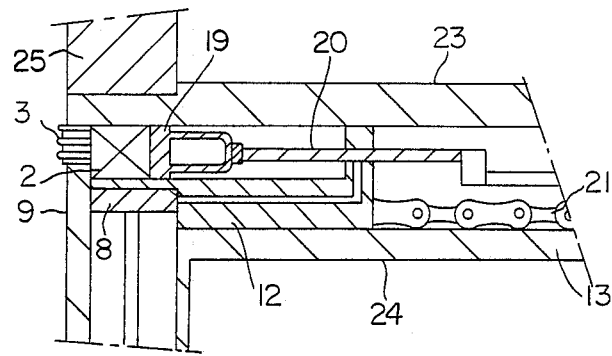
Figure 8:
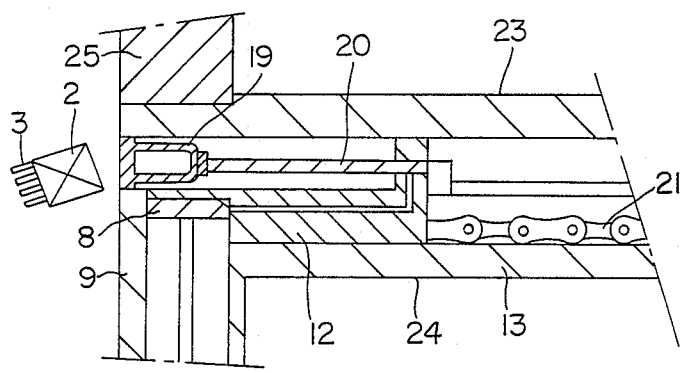

The release of the locking means 27 disposed between the drive means 20 and the body of the pusher 12 is then controlled (FIG. 6).

The pusher 12 remaining in place, the drive means 20 then acts solely on the blade 19 in order to advance the element and terminate cutting.

In the embodiment shown in these Figures, the locking means 27 is constituted by a horizontal mobile rod 29 which passes through the body of the pusher over a part of its length. One of its ends 30 opens out in cavity 18, the other end 31 is terminated by an inclined surface. When the end 30 comes into abutment on the clamp 8, the rod 29 is pushed back.

The inclined surface then performs a role of cam on a roller fast with a rod 32 mounted with a spring and which is perpendicular to the rod 29; this rod 32 is fitted at its free end in a bore 33 in the drive means 20. Rod 29 moving back, rod 32 descends, then releasing its free end from the bore.

The drive means 20 may then advance freely.

Other locking means may, of course, be suitable.

The last cut being effected (FIG. 8), the thrust blade continues its stroke and ejects the endpiece 2. During its rearward movement, the blade 19 resumes its position in the body of the pusher where its drive means 20 has just locked.

What is claimed is:

1. A pusher acting on the endpiece of a fuel element in order to move said fuel element along a magazine having a substantially rectangular-shaped passageway, defined by four walls, towards a cutting device which comprises an auxiliary holding clamp, a principal holding clamp and a counter-blade, said pusher comprising a body of which the largest transverse section is substantially equal to that of the magazine, and a means for driving said body, characterized in that said body comprises:
   a member having front and rear faces,
   a cavity of transverse section substantially equal to that of said endpiece, said cavity being open on portions of two adjacent walls of the magazine, and one the front face of the body, said cavity in said body having three substantially mutually perpendicular faces,
   the front face of said body having a recess opening over the entire width of one wall of the interior and over portions of those walls adjacent said last-mentioned one wall; said recess having two substantially mutually perpendicular faces, each being perpendicular to those walls adjacent said last-mentioned wall of the interior passageway of said magazine and being positioned and dimensioned for said auxiliary clamp to be removably positioned therein;
   a portion of the body of the pusher between said recess and said cavity supporting said fuel element when the auxiliary clamp is displaced from said passageway, said fuel element supporting portion of said body cooperating with said auxiliary clamp to support said element;
   a mobile blade disposed for slidable movement along said cavity and adapted to engage the endpiece and when actuated by a drive means, capable of pushing said element when the front face of the pusher engages the principal holding clamp; and
   locking means which connects said blade and the driving means to the body of the pusher.

2. A pusher according to claim 1 characterized in that the locking means is constituted by a first rod movable along the body of the pusher which, upon engagement with the auxiliary holding clamp, releases a second rod engaging the driving means.

3. Apparatus for advancing a fuel element to facilitate cutting of said element comprised of an end piece supporting a plurality of fuel element pencils, said apparatus comprising:
   a magazine having a hollow, substantially rectangular-shaped interior passageway defined by four walls;
   a pusher arranged within said passageway and having a shape generally conforming to the cross-sectional shape of said interior and substantially filling said interior space while being freely slideable therealong;
   said pusher having front and rear faces arranged transverse to the length of said magazine;
   said pusher having a cavity defined by three substantially mutually perpendicular surfaces, one of said surfaces being substantially parallel to and inwardly displaced from said front face;
   said pusher having a recess defined by two substantially perpendicular planar surfaces, one of said surfaces being substantially perpendicular to said front face and the remaining one of said surfaces being substantially parallel and displaced inwardly from said front face;
   said cavity cooperating with the adjacent interior walls of said magazine to define a region conforming to the end piece of a fuel element so as to position and receive said end piece therein;
   reciprocally mounted first and second holding clamps, said first holding clamp being selectively engageable with the fuel element pencils preparatory to a cutting operation and said second clamping element being selectively engageable with said fuel element pencils and said pusher recess as said pusher moves beyond a predetermined position relative to said first and second holding clamps;
   a blade slideably mounted within said cavity for advancing said end piece and hence said pencils towards said first reciprocating holding clamp thereby enabling advancement of the fuel element to the position of said first holding clamp when said pusher is blocked against further movement due to engagement of the front face of said pusher with said first holding clamp.

4. The apparatus of claim 3 further comprising means for moving said pusher and said blade in a first state and for moving only said blade when in a second state.

5. The apparatus of claim 4 further comprising first pushing means for advancing said pusher towards said first and second holding clamps; and
   second pushing means for advancing said blade when said pusher engages said second holding clamp.

6. The apparatus of claim 5 wherein the operating state of said means for moving is controlled by a slideable rod which causes said means for pushing to be maintained in said first sate when said slideable rod is displaced from said second holding clamp and for shifting said means for pushing to said second state when said slideable rod engages said second holding clamp.

7. The apparatus of claim 4 wherein said means for moving comprises an elongated member slideably extending through a suitable opening provided in said pusher and having the end thereof extending through said opening and being secured to said blade;
   a second member arranged for reciprocating movement within said pusher;
   said elongated member having an opening;
   said reciprocating member being movable into said opening responsive to engagement by a second rod reciprocably mounted within said pusher which urges one end of said first reciprocating member into the opening in said elongated member when said second reciprocating member engages said second holding clamp.

8. The apparatus of claim 7 further comprising bias means for removing said first reciprocating member from the opening in said elongated member when said pusher and hence said second reciprocating member is displaced from said second holding clamp.

9. The apparatus of claim 3 wherein the size of said recess is chosen so as to minimize a separation distance between said second holding clamp and said fuel element when said second holding clamp is positioned in said recess.

10. Apparatus for advancing a fuel element to facilitate cutting of said element comprised of an end piece supporting a plurality of fuel element pencils, said apparatus comprising:
   a magazine having a hollow, substantially interior passageway;
   a pusher arranged within said passageway and having a shape generally conforming to the cross-sectional shape of said passageway and substantially filling said interior space while being freely slideable therealong;
   said pusher having front and rear faces arranged transverse to the length of said magazine;
   said pusher having a recess in said front face;
   said pusher also having a cavity in said front face cooperating with an adjacent portion of said passageway to define a region conforming to the shape of the end piece of a fuel element so as to position and receive said end piece therein;
   reciprocally mounted first and second holding clamps, said first holding clamp being selectively engageable with the fuel element pencils preparatory to a cutting operation and said second holding clamp being selectively engageable with said fuel element pencils and said pusher recess as said pusher moves beyond a predetermined position relative to said first and second holding clamps; and
   a blade slideably mounted within said cavity for advancing said end piece and hence said pencils towards said first reciprocating holding clamp thereby enabling advancement of the fuel element to the position of said first holding clamp when said pusher is blocked against further movement due to engagement of the front face of said pusher with said first holding clamp.

* * * * *

UNITED STATES PATENT AND TRADEMARK OFFICE
CERTIFICATE OF CORRECTION

PATENT NO. : 4,968,204

DATED : November 6, 1990

INVENTOR(S) : Griveau et al.

It is certified that error appears in the above-identified patent and that said Letters Patent is hereby corrected as shown below:

Column 5, line 29, "one" should be --on--

Signed and Sealed this

Seventeenth Day of March, 1992

Attest:

HARRY F. MANBECK, JR.

*Attesting Officer*     *Commissioner of Patents and Trademarks*